UNITED STATES PATENT OFFICE.

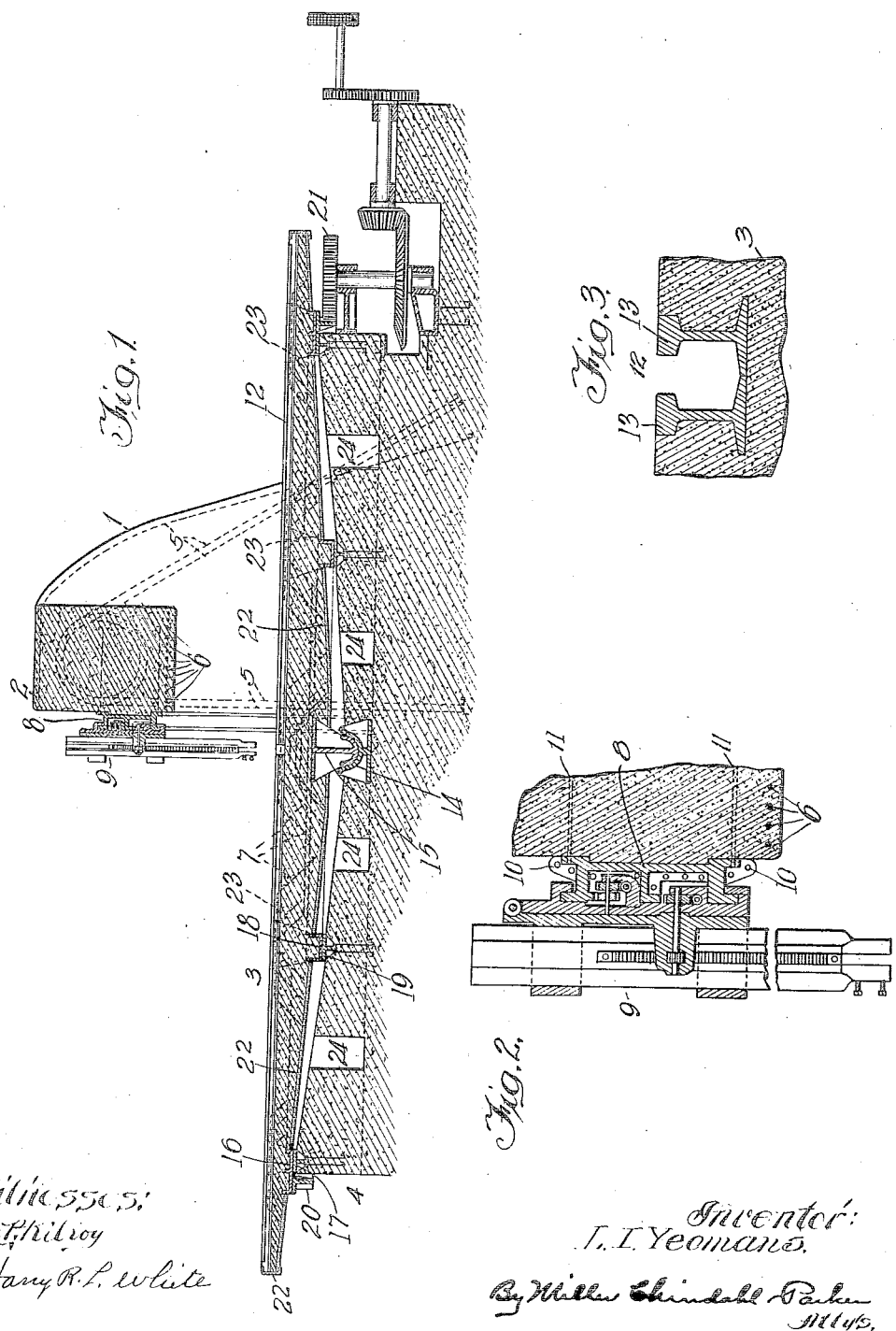

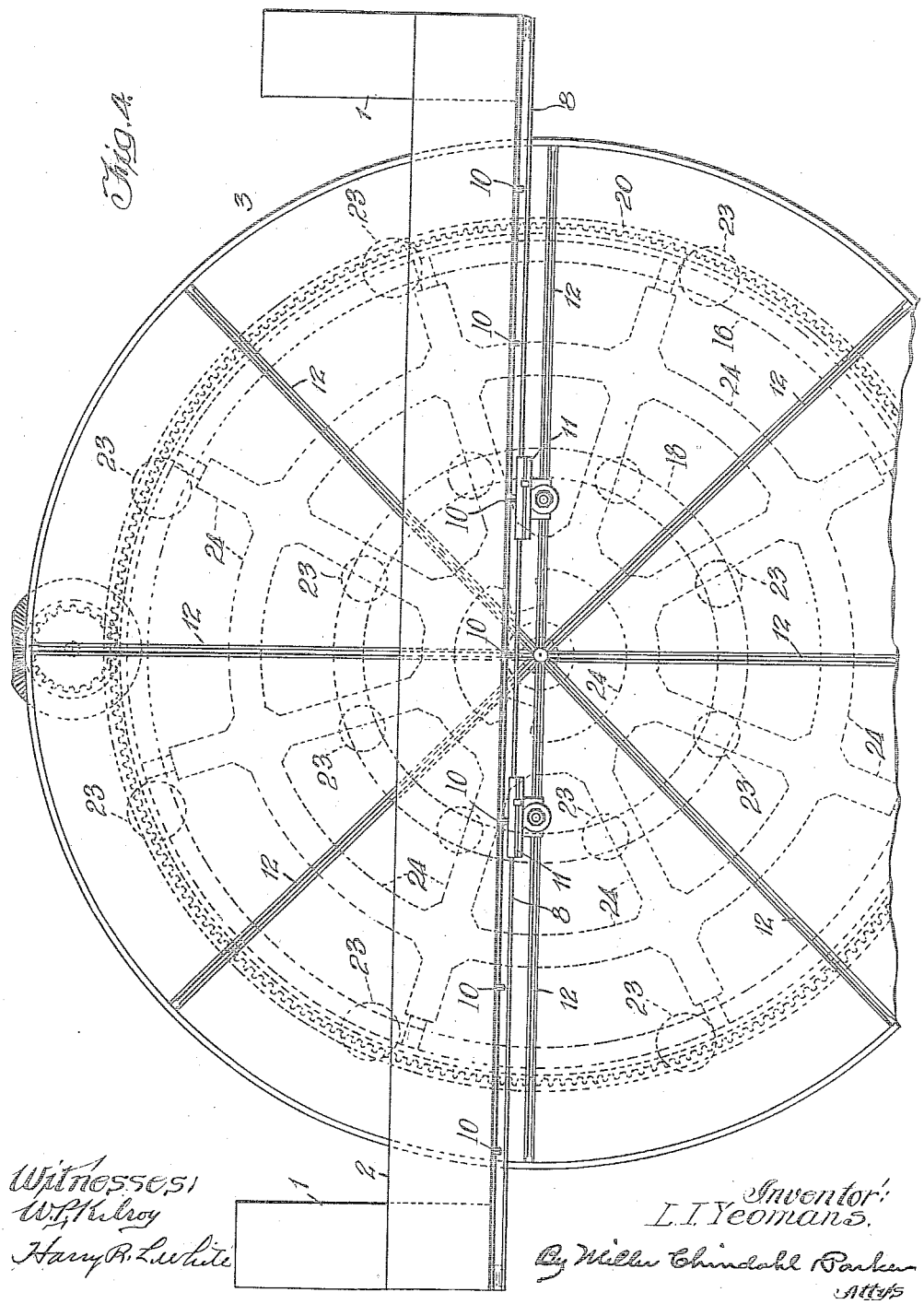

LUCIEN I. YEOMANS, OF CHICAGO, ILLINOIS, ASSIGNOR TO T. K. WEBSTER, TRUSTEE, OF CHICAGO, ILLINOIS.

MACHINE-TOOL.

1,309,383.  Specification of Letters Patent.  Patented July 8, 1919.

Application filed August 9, 1917. Serial No. 185,257.

*To all whom it may concern:*

Be it known that I, LUCIEN I. YEOMANS, a citizen of the United States, residing at Chicago, in the county of Cook and State of Illinois, have invented certain new and useful Improvements in Machine-Tools, of which the following is a specification.

The production of machine parts and other metallic articles requiring machining is, of course, limited by the number and capacity of the machine tools available for the work. The larger the parts to be machined, the greater the difficulty in speeding up the production of such parts. In the case of parts of maximum size, as, for example, certain types and sizes of gun carriages, the number of machine tools of the requisite size in existence is so very small and the time required to build additional machine tools is so great that a considerable increase in production is impossible under present conditions. Such limitation upon production is particularly deplorable in the case of munitions of war or large machine tools used in the production of munitions.

The object of this invention is to provide a form or system of construction by means of which very large boring mills, planers and other machine tools may be constructed comparatively quickly and cheaply. Heretofore such machine tools have comprised large metallic parts, the machining of which necessitated the use of large machine tools. I attain the object of this invention by constructing the large members of reinforced concrete, and by using for the working surfaces metal parts of relatively small size which may be machined on machine tools of common size, said metal parts being embedded in or otherwise suitably attached to the concrete.

In the accompanying drawings, Figure 1 is a vertical central sectional view of a boring mill embodying the features of my invention. Fig. 2 is a fragmental view on an enlarged scale showing the tool carriage and its support. Fig. 3 is a view illustrating the method of forming undercut or T-slots in the table. Fig. 4 is a fragmental top plan view of the machine.

The embodiment herein shown of the invention comprises two pillars 1 which support a horizontal beam 2, said beam spanning a revoluble table 3. The bed or frame upon which the table 3 is mounted is indicated at 4. Each of these parts is constructed of reinforced concrete. The reinforcing may be of any ordinary or preferred type adapted to resist the stresses arising in use. The steel bars commonly used in reinforcing concrete structures may be employed. Since the principles governing the reinforcement of concrete are well understood, I have deemed it unnecessary to illustrate the reinforcement in detail. 5 denotes bars which reinforce the concrete forming the pillars 1. 6 are bars which reinforce the beam 2 against tension. 7 indicates reinforcing bars in the table. Upon the forward side of the beam 2 is mounted a rail 8 (Fig. 2) that serves to support the tool carriages 9. For convenience of manufacture, the rail 8 is preferably formed in relatively short sections suitably secured together, as indicated at 10, and secured to the beam 2 by means of attaching members 11 (Fig. 2) embedded in the concrete. The tool carriages may be of any ordinary or desired construction.

The face of the table 3 is provided with suitable means to facilitate the attachment thereto of the pieces to be machined. Herein I have shown radial undercut or T-slots 12. While these slots may be formed in any suitable manner, they are herein shown as formed by embedding pairs of railroad rails 13 in the concrete, as best indicated in Fig. 3.

The table 3 is provided with a central bearing comprising, in this instance, a socket member 14 embedded in the bed 4 and a pivot member 15 embedded in the table 3 and having a rounded lower end to fit within the socket member 14. The table is also supported near its periphery by means of an annular shoe 16 resting upon a circular track or rail 17, said shoe and rail being suitably fixed to the table 3 and the bed 4, respectively. If desired, the table may be supported intermediate its periphery and center by means of a circular shoe 18 resting upon a circular rail 19, said parts being secured to the table and the bed, respectively. The table may be rotated by any suitable means. Herein is shown a circular rack 20 formed in sections of suitable length and secured to the table 3 near the periphery thereof, as, for example, by attaching the rack to the shoe 16. The rack 20 meshes with the gear wheel 21, which is driven by any suitable train of mechanism.

Referring now more particularly to the manner in which the table 3 is constructed: After the bed 4 has been completed the concrete is allowed to set for a time until it has practically ceased shrinking, it being a known fact that concrete, after it is poured, continues to shrink in the hardening process for a great length of time. After the first two weeks, however, the shrinkage is practically negligible. When such initial period has elapsed, annular forms (not shown) of wood or other suitable material are positioned upon the rails 17 and 19, said forms serving to provide spaces to be later occupied by the rails 16 and 18. The pivot member 15 also is set in place upon the bearing 14. A form defining the lower side and the periphery of the table is then constructed of metal plates 22, supporting blocks being interposed between the lower side of the form and the bed 4. The reinforcing bars for the table and the rails 13 are then positioned within the form. Cores (not shown) are then set upon the before-mentioned annular forms in order to provide openings 23 extending vertically through the table. The concrete is then poured into the form. After the concrete has seasoned sufficiently so that shrinkage has stopped, the table is raised by means of jacks, the wooden annular forms and the cores removed, the rails 16 and 18 put in place and grout poured through the openings 23 for the purpose of uniting said rails to the table.

A system of intercommunicating passageways 24 is provided in the bed 4 to permit access to the space beneath the table during the operations incident to the construction of said table, and to afford access to the surfaces requiring lubrication and inspection.

By means of the type of construction herein disclosed, it is possible to produce a boring mill, a planer or other machine tool of any desired magnitude in approximately as many months as years are required under former methods, and at greatly reduced cost.

I claim as my invention:

1. A machine tool comprising a bed having a plurality of metallic bearing members, a work support constructed of monolithic reinforced concrete and having metallic bearing members engaging with the bearing members of the bed to mount the support for movement upon the bed, and means for supporting a tool above the work support.

2. A machine tool comprising a bed and a work support each constructed of monolithic reinforced concrete and having a plurality of metallic bearing members, the bearing members of the bed being arranged to coöperate with the bearing members of the support to mount the support for movement upon the bed, and means for supporting a tool above the work support.

3. In a machine tool having a bed and a work support thereon, means for supporting a tool above the work support comprising a pair of pillars at opposite sides of the work support and a beam carried by the pillars above the work support, said pillars and beam being constructed of reinforced concrete, and a metallic tool supporting rail secured to the beam.

4. A machine tool having a concrete bed, a central bearing member and a peripheral annular rail embedded in the concrete of the bed, a reinforced concrete table, a central bearing member embedded in the concrete of the table and co-acting with the other bearing member to support the table, an annular shoe attached to the table and slidably mounted on said rail, means for rotating the table, and means for supporting a tool above the table.

5. A machine tool having a concrete table and two railroad rails embedded in the concrete of the table side by side and in parallel relation, the heads of said rails being adjacent to the surface of the table, said rails providing between them an undercut slot.

6. A boring-mill having a bed, a table rotatably mounted upon the bed, said table having a central metallic bearing member and an annular metallic carrying member, a sheet-metal form defining the lower side of the table, a metallic reinforcement upon said form, concrete filling said form and investing said reinforcement, said central bearing member and annular carrying member being bonded to the concrete, and means for supporting a tool in operative relation with the table.

7. A machine tool for operating upon machine parts of maximum size, wherein the massive parts of the tool are made of reinforced concrete and are provided with metallic members forming bearing surfaces between relatively movable parts.

In testimony whereof, I have hereunto set my hand.

LUCIEN I. YEOMANS.